April 23, 1963     H. T. ARMSTRONG ETAL     3,086,396

HIGH-TEMPERATURE PROBE ASSEMBLY

Filed Sept. 22, 1960

INVENTORS
HOMER T. ARMSTRONG
TEUNIS MAARLEVELD
KENT P. O'KELLY

BY George J. Rubens
ATTORNEY

United States Patent Office 3,086,396
Patented Apr. 23, 1963

3,086,396
HIGH-TEMPERATURE PROBE ASSEMBLY
Homer T. Armstrong, Arlington, Teunis Maarleveld, Dallas, and Kent P. O'Kelly, Arlington, Tex., assignors, by mesne assignments, to the United States of America as represented by the Secretary of the Navy
Filed Sept. 22, 1960, Ser. No. 57,856
7 Claims. (Cl. 73—212)

The present invention relates to a high-temperature probe assembly and more particularly to a fixed probe with supporting structure for sensing a condition within a high-temperature gas stream such as measuring velocity pressures in the exhaust gases of a jet engine.

A probe or "rake" for measuring velocity pressures in the exhaust gases of a jet engine is necessary for in-flight measurements of gross thrust of the engine. Because it has not been considered practicable to provide a probe which would continually withstand the heat and errosive effects of the jet exhaust blast, resort has previously been to a probe with a mechanism for swinging it quickly into and out of the exhaust blast in such a manner that the probe is not exposed to the blast long enough to be damaged thereby. One disadvantage of such an arrangement resides in the complications involved in affording the necessary mechanism for swinging the probe. Further, the pressure picked up by the probe varies with its location within the exhaust blast and for this reason instantaneous readings must be taken of the pressure values transmitted from the probe and any reading must be interpreted and corrected in view of where the probe was relative to the center line of the exhaust blast when the reading was taken. Much inconvenience and a large probability of error are introduced by this approach since it is difficult to know, at any one instant, the precise location of the moving probe.

The present invention overcomes the disadvantages of the moving probe by providing a fixed supporting structure having a unique means for cooling the structure as well as the probe. The supporting structure is framed with tubular members some of which are fixed to an afterburner wall section and another which projects forward with the probe therein. The members fixed to the afterburner wall section are positioned substantially transverse the engine and have openings at a leading edge with a baffle forward of the openings so that cooling air supplied within the members cools the outside of the member as well as the inside. The member projected forward carrying the probe communicates with the other members so that cooling air is supplied to this member and the probe. The probe projects beyond this latter member and is flared so that cooling air leaving the member strikes the flared portion of the probe and then is carried over the exterior of the member by the exhaust gases. Accordingly, by a unique arrangement of the supporting structure and cooling system a reliable fixed probe has been made possible.

An object of the present invention is to provide a fixed probe within a high-temperature gas stream for sensing or measuring a condition of said stream, such as pressure.

Another object is to provide a cooling arrangement for a probe and supporting structure which will maintain their temperatures sufficiently below their melting point to prevent damage thereto.

Other objects and many of the attendant advantages of this invention will be readily appreciated as the same become better understood by reference to the following detailed description when considered in connection with the accompanying drawings wherein.

Figure 1:
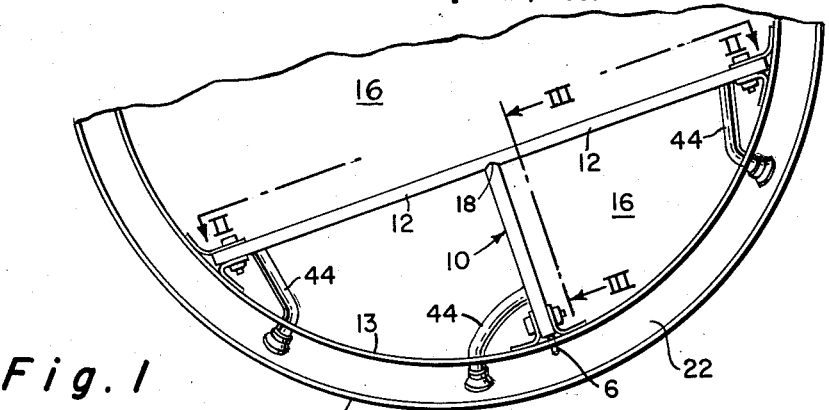
FIG. 1 is an after end view, partially cut away, of a jet engine.
Figure 2:
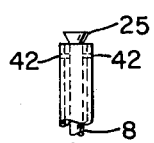
FIG. 2 is a view of the device taken along line II—II of FIG. 1.
Figure 3:
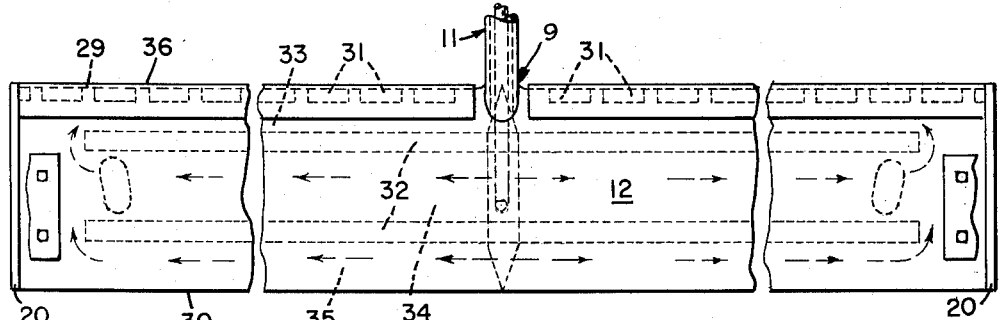
FIG. 3 is a view of the device taken along line III—III of FIG. 1.
Figure 3:
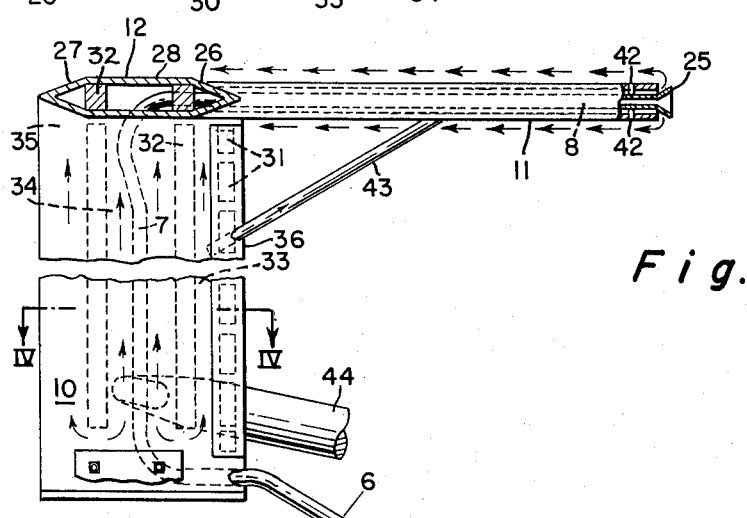

Referring now to the drawings, wherein like reference numerals designate like or corresponding parts throughout the several views, there is shown in FIG. 3 a probe tube 6 having a transverse portion 7 extending substantially normal to a jet exhaust stream and an upstream portion 8 extending substantially upstream from the transverse portion. A jacket member 9 has a transverse portion 10 encompassing and extending along the transverse portion 7 of the probe and an upstream tubular portion 11 encompassing and extending along the upstream portion 8 of the probe. As shown in FIG. 1 the transverse portion 10 of the jacket and a crosspiece member 12 form three supporting legs of the assembly each of which has an end fixed to an afterburner wall 13. The crosspiece 12 lies along a chord of an opening 16 defined by the afterburner wall 13 and the crosspiece 12 and the portion 10 of the jacket lie in a plane which is substantially normal to the exhaust stream. The crosspiece 12 and the portion 10 each have interior passages which communicate with one another through a joining point 18 where the passages open into one another, these passages being sealed at their ends by plates 20. The probe 6, connected at one end to a pressure indicator (not shown), travels within a space 22 between the afterburner wall 13 and a fuselage skin 24 and then extends through the afterburner wall 13 and into the portion 10. The probe 6 extends a short distance beyond the upstream portion of the jacket and has a flared portion 25 which opens to face a flow of jet exhaust gases. For the purposes of this description, the flared portion 25 opens to face the flow of the exhaust gases when the opening is directed anywhere within an angle from a normal to the stream flow up to but not including a parallel to the stream flow. The crosspiece 12 and the portion 10 each have a forward angled portion 26 and an after angled portion 27 and each have flattened portions 28 on opposite sides, the planes of these flattened portions being positioned substantially parallel to the flow of exhaust gases. The crosspiece 12 and the portion 10 each have a leading edge 29 and a trailing edge 30, the leading edges 29 facing the flow of exhaust gases. Both the crosspiece 12 and the portion 10 have along their leading edge 29 a plurality of vents 31 which open their interior passage into the opening 16.

Figure 4:
FIG. 4 is a cross-sectional view of the device taken along line IV—IV of FIG. 3.

The cross section of the portion 10, as shown in FIG. 4, is identical to a cross section (not shown) of the crosspiece 12 except that the latter does not show the probe. The crosspiece 12 and the portion 10 each have two channels 32 which divide them into a forward passage 33, a middle passage 34 and an after passage 35. The channels 32 terminate short of the end plates 17 so that each of these passages communicate with one another and the other ends of the channels 32 within portion 10 terminate in close proximity to the channels 32 within the crosspiece 12. A U-shaped baffle 36 is fixedly mounted at its inner curved portion to each of the leading edges 29 and has arms 37 which are spaced approximately .05 of an inch from sides of the forward angled portion 26 of the crosspiece 12 and the portion 10. The probe 6 is circular in cross section and has an external diameter equal to or less than the least internal measurement of the portion 10 and is less than the internal diameter of the upstream portion 11 of the jacket. The probe 6 is positioned within the middle passage 34 of the portion 10 so that there are at least two air passages within the middle passage on opposite sides of the probe. The probe is positioned concentric with the upstream portion 11 of the jacket by screws 42 so that an annular air passage circumscribes the probe and opens toward the flared portion 25 of the probe. A circular brace tubular member 43 is fixed to the portion 10 and the upstream portion 11 of the jacket and opens into each so that there is further communication between the interior passages.

A coolant, such as air, is supplied to the assembly by ducts 44 which are attached at one end to a compressed air source (not shown) and open at their other ends into the middle passages 34 of the crosspiece 12 and the portion 10 near each of the ends of the crosspiece and near the end of the portion 10 fixed to the afterburner wall 13.

In the operation of the device, cooling air is supplied by the ducts 44 to the crosspiece 12 and the portion 10 as described above. A majority of the air travels to the forward passage 33 of the crosspiece 12 and the portion 10 where some of the air exits through the vents 31 and the remainder exits through the upstream portion 11 of the jacket. That air which exits through the vents 31 strikes the baffle 36 and is deflected downstream over the sides of the forward angled portion 26 and upon leaving the baffle is directed further downstream over the flattened portions 28 and across the after angled portion 27 by the flow of exhaust gases. The cooling air that reaches the upstream portion 11 of the jacket through the forward passages 33 and the brace member 43 travels along the probe 6 and out the end of the upstream portion 11 of the jacket and then over the flared portion 25 of the probe after which it is directed aft over the exterior of the upstream portion 11 of the jacket by the exhaust gases. In actuality, the flared portion 25 of the probe acts as another baffle upstream from the end of the up-stream portion 11 of the jacket which latter end can be considered as another leading edge.

The above-described parts of the probe assembly are made, of course, of heat-resistant materials, preferably metallic. It has been found that the capability, of the metallic parts, of resisting the high temperatures of the exhaust stream is much improved where a protective coating is applied to surfaces of the probe assembly. This coating can take the form of alternate layers of alumina and molybdenum. The coating protects the probe assembly from oxidation and erosion. In addition, the coating serves, by virtue of its metallic layers, to spread the heat more uniformly, thus ensuring that all the air passed through and over the assembly does its full share in keeping the assembly cool. This benefit would not be obtained if some of the air passed over very hot inner and outer surfaces of the assembly while the remainder passed over only relatively cool surfaces. In addition, the alumina (or equivalent) layers of the coating is an insulating material which slows the flow of heat to the underlying metallic parts, and the air passing over inner surfaces of those parts does not have to absorb as much heat to keep them cool. As a consequence, utilization of the coating permits a reduction in the flow-rate of the cooling fluid without dimunition of the heat-resistance of the assembly. The preferred coating is described in the article by William L. Aves appearing in the March 1959 issue of the periodical Metal Progress. To provide an example, the coating requirements of the probe, as it was employed in one given set of operating conditions, called for the application of alternate layers of molybdenum (0.0008-inch thick) and alumina (0.003-inch thick) until eight layers of molybdenum and seven layers of alumina had been applied. While heat resistance of the assembly is benefitted and improved by coating only the baffles 36 and flared portion 25, it has been found preferable to coat all exterior surfaces of the probe assembly. In the particular example cited above, the flared portion 25 was coated as stated, then an additional layer of alumina was applied; over this was added a layer (0.005 inch thick) of molybdenum, which was then polished on the concave side of the flared portion.

It is now apparent that the invention provides a unique structure and cooling arrangement for a fixed probe within the exhaust of a jet engine or the like. The cooling is effected over the exterior as well as the interior of the supporting members and the critical flared portion of the probe as well as its other portions are likewise cooled.

Obviously many modifications and variations of the present invention are possible in the light of the above teachings. It is therefore to be understood that within the scope of the appended claims the invention may be practiced otherwise than as specifically described.

We claim:

1. A device for measuring velocity pressures in a high-temperature gaseous stream comprising a probe tube having a transverse portion extending substantially transverse of said stream and an upstream portion extending substantially upstream from said transverse portion, the upstream portion of the probe having an open end which faces the stream, a jacket member having a transverse portion encompassing and extending a length of the transverse portion of the probe and having an upstream portion encompassing and extending a length of the upstream portion of the probe, the upstream portion of the jacket having an open end facing the stream, the jacket member having an interior surface which is spaced from an exterior surface of the probe so as to define an interior transverse passage and an interior upstream passage in communication with one another with the latter passage opening into said stream, the jacket member having a first leading edge extending along the length of its transverse portion, a first baffle secured to and extending along said first leading edge, said baffle conforming to and spaced from a portion of an exterior surface of the jacket member on both sides of the first leading edge so as to define an exterior passage with respect to the transverse portion of the jacket member, the transverse portion of the jacket member having at least one vent opening into the interior transverse passage and the exterior transverse passage so as to communicate one with the other, the open end of the probe extending a predetermined distance upstream from the open end of the upstream portion of the jacket member, the open end of the upstream portion of the jacket member being a second leading edge of the jacket member, a second baffle formed by a flared configuration of the extension of the upstream portion of the probe and means for supplying a coolant to the jacket member whereby the coolant is discharged through the vent to cool the transverse portion of the jacket member and through the open end of the upstream portion of the jacket member to cool the flared extension of the probe and the latter mentioned portion of the jacket member.

2. A device as claimed in claim 1 wherein a tubular support member is fixedly joined at an angle to the jacket member, the support member having an interior passage opening into the interior passage of the jacket member and having a leading edge facing upstream secured to and extending along the leading edge of the support, the plate conforming to and spaced from a portion of an exterior surface of the support member on both sides of the support's leading edge so as to define an exterior passage with respect to the support, the support's leading edge having at least one vent opening into the support's interior and exterior passage so as to communicate one with the other and said means for supplying a coolant to the jacket member including means for supplying a coolant to the support member whereby the exterior surface of the support member is cooled.

3. A device as claimed in claim 1 wherein at least one channel member is located within the interior passage of the transverse portion of the jacket member and extends a portion of a length of said latter passage so as to divide the latter passage into an upstream passage and a downstream passage and said channel having ends each of which is spaced from a respective end of the latter passage so as to define end passageways communicating the upstream passage with the downstream passage whereby the coolant flows primarily in the upstream passage.

4. A device as claimed in claim 3 wherein two spaced channel members are located within the interior passage of the jacket member's transverse portion so as to define an upstream passage, a middle passage and a downstream passage the end passageways communicating the passages with one another, the jacket member's transverse portion being two plates joined along a pair of respective edges to form said first leading edge and another pair of respective edges joined to form a trailing edge, the plates being parallel along the middle passage and angled toward each other in each of the upstream and downstream passages.

5. A device as claimed in claim 3 wherein a tubular bypass member is joined at one end to the transverse portion of the jacket member intermediate that portion's ends and is joined at another end to the upstream portion of the jacket member intermediate that portion's ends, each end of the bypass member opening into a respective interior passage of the jacket member's portions so as to communicate one with the other and said means for supplying a coolant to the jacket member having a discharge orifice opening into a furthest end passageway from the upstream portion of the jacket member whereby an increased amount of coolant is directed to the latter portion for cooling the flared extension of the probe and the exterior surface of the latter portion.

6. In a jet engine having an exhaust opening defined by an afterburner wall; a fixed probe assembly for measuring velocity pressures in a high-temperature exhaust gas stream through the exhaust opening comprising a probe tube having a transverse portion extending substantially normal to said stream and an upstream portion extending substantially upstream from said transverse portion, the upstream portion having an open flared end facing the exhaust stream, a jacket member having a transverse portion encompassing and extending a length of the transverse portion of the probe and having a tubular upstream portion encompassing and extending a length of the upstream portion of the probe, the upstream portion of the jacket having an open end terminating adjacent the flared open end of the probe, the jacket member having interior surfaces which are spaced from an exterior surface of the probe so as to define an interior transverse passage and an annular interior upstream passage in communication with one another, the latter passage opening into the stream through said open end of the upstream portion of the jacket, a tubular crosspiece member having two closed ends and an interior passage, the crosspiece being joined intermediate its ends perpendicular to each of the portions of the jacket at a joining point of the portions so that the crosspiece and the portions of the jacket are commonly joined at a same point and have their respective interior passage communicating with each other, the crosspiece extending across a chord of the exhaust opening with each of its ends fixedly attached to a respective point on the afterburner wall, the transverse portion of the jacket member having a closed end fixedly attached to another point on the afterburner wall, means mounted on the upstream portion of the jacket member near its open end for rigidly positioning the upstream portion of the probe within the latter portion of the jacket member, the transverse portion of the jacket and the crosspiece on each side of the jacket member being supporting legs of the probe assembly each of which has a leading edge facing said exhaust stream and a trailing edge, a U-shaped baffle having a leading inside edge which is fixedly attached along each of said leading edges of the supporting legs and having portions on each side of its leading edge which conform and are in close proximity to a leading portion of the supporting legs on both sides of their leading edge so as to define an exterior passage between the supporting legs and the respective baffles, said supporting legs each having a plurality of spaced vents along their respective leading edge which open into their respective interior passage and exterior passage, the crosspiece and the transverse portion of the jacket each having two channels extending a length within their respective interior passage which are spaced from each other and from a leading and a trailing portion of each interior passage so as to divide the interior passages into an upstream passage, a middle passage and a downstream passage, the channels each having two ends each of which are spaced from a respective end of each interior passage so as to define end passageways communicating the upstream, middle and downstream passage of each interior passage with one another, the supporting legs each having an end of a coolant supply tube opening into a middle passage near an end passage closest the afterburner wall whereby the coolant circulates primarily in the upstream passages relative to the middle and downstream passages, through the vents to cool the baffles and the exterior surfaces of the supporting legs and through the upstream portion of the jacket to strike and cool the flared portion of the probe after which the coolant is directed downstream over the latter portion of the jacket.

7. A device for sensing a condition within a high-temperature gaseous stream comprising a probe tube having an open end which extends into and faces said stream, a jacket member encompassing and extending at least a portion of a length of the probe within the stream, the jacket member having an interior surface which is spaced from an exterior surface of the probe so as to define an interior passage therebetween, the jacket member having along its length at least one leading edge facing upstream, the jacket member at its leading edge having at least one vent opening from the interior pasage to the gas stream, at least one channel member spaced from the leading edge and bridging across the interior surface of the interior passage so as to divide the interior passage into an upstream passage and a downstream passage and said channel having ends each of which is spaced from a respective end of the interior passage so as to define end passageways communicating the upstream passage with the downstream passage, means for supplying a coolant to the jacket member and means for baffling the coolant exhausting through the vent toward an exterior surface of the jacket member whereby the coolant flows primarily in the upstream passage, then out through the vent over an exterior surface of the jacket so as to protect the probe from the damaging effects of the high-temperature gaseous stream.

References Cited in the file of this patent

UNITED STATES PATENTS

| 2,706,408 | Holbrook | Apr. 19, 1955 |
| 2,780,061 | Clarke | Feb. 5, 1957 |
| 2,846,843 | Clark | Aug. 12, 1958 |
| 2,975,225 | Barbieri et al. | Mar. 14, 1961 |

FOREIGN PATENTS

| 585,343 | Great Britain | Feb. 5, 1947 |
| 614,487 | Great Britain | Dec. 16, 1948 |
| 724,276 | Great Britain | Feb. 16, 1955 |
| 748,020 | Great Britain | Apr. 18, 1956 |

OTHER REFERENCES

Aves: Coating for Re-Entry, Metal Progress, March 1959, vol. 75, No. 3 (pages 90–94).